Sept. 30, 1952     P. C. CLARKE     2,612,042
FORCE MEASURING DEVICE
Filed Feb. 19, 1947     3 Sheets—Sheet 1
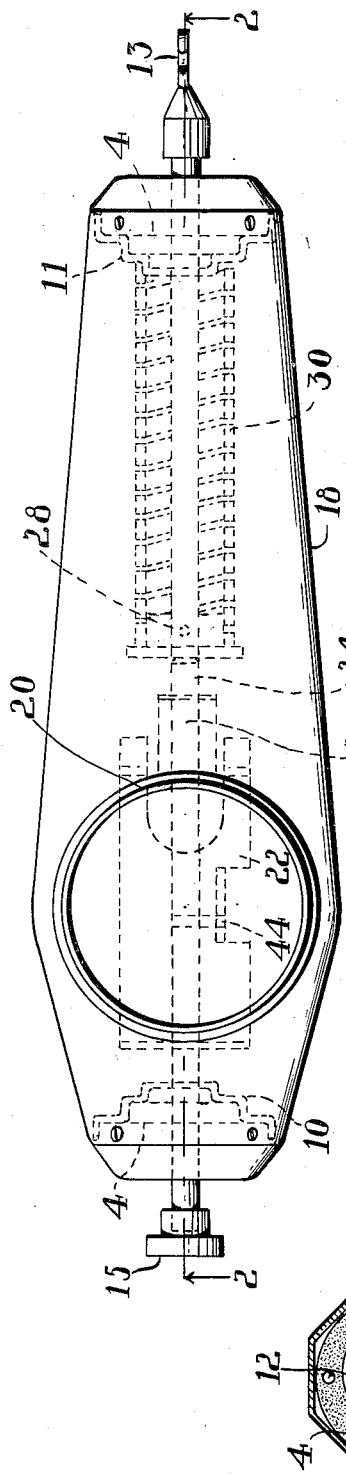
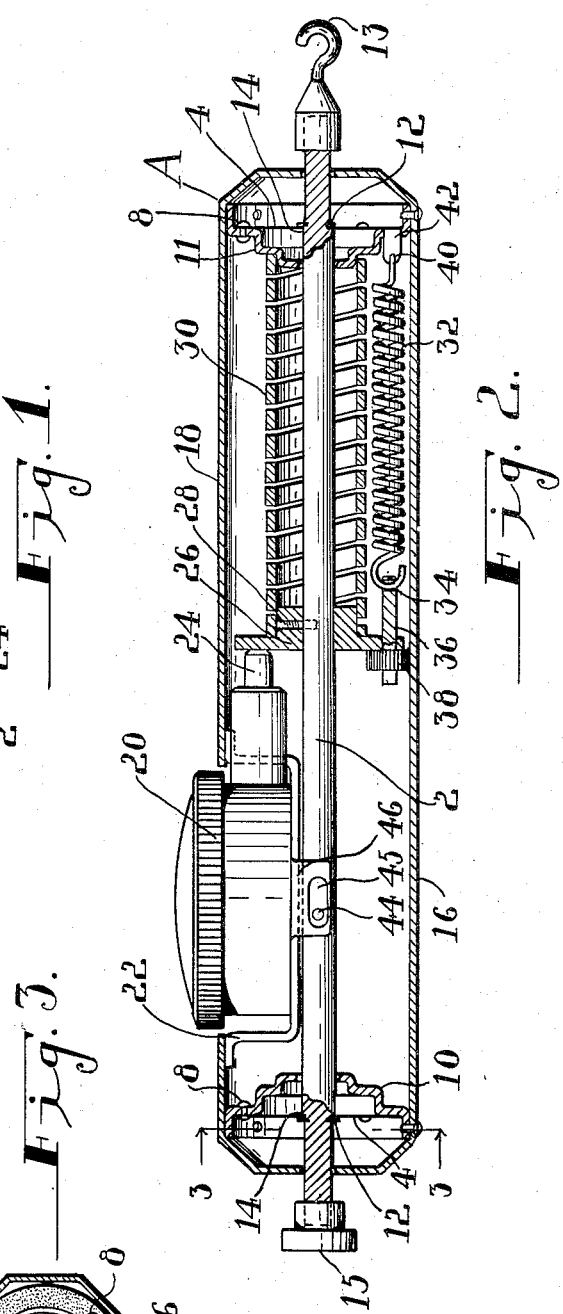
INVENTOR.
Philip C. Clarke
BY
Busser & Harding
ATTORNEYS

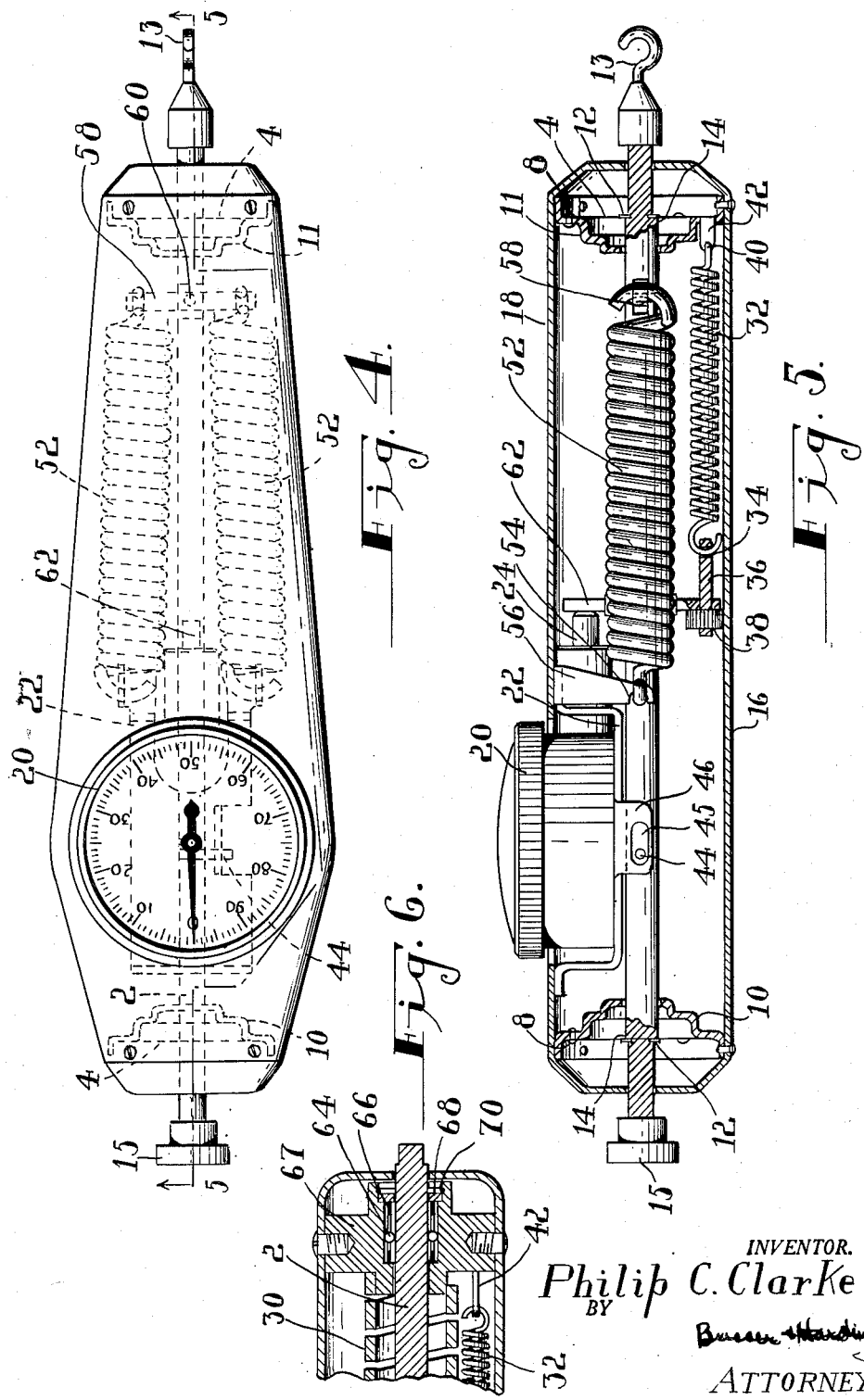

Patented Sept. 30, 1952

2,612,042

UNITED STATES PATENT OFFICE 2,612,042

FORCE MEASURING DEVICE

Philip C. Clarke, Line Lexington, Pa., assignor to Hunter Spring Company, Lansdale, Pa., a corporation of Pennsylvania Application February 19, 1947, Serial No. 729,459

4 Claims. (Cl. 73—141)

This invention relates to an improvement in a force measuring device and more particularly to a hand force measuring device of improved accuracy.

At present the trial and error method is used in the determination of the force and displacement characteristics of a spring required to perform a certain function, such as, for example, returning the foot throttle linkage of an automobile to the closed position. An object of this invention is to provide a device which will solve such problems and thus eliminate the loss of time incident to the trial and error method.

A further object of this invention is to provide a force measuring device which is uniformly accurate throughout its complete range.

This and other objects will be apparent in the following description, read in conjunction with the drawings, in which:

Fig. 1 is a plan view of a device embodying this invention;

Fig. 2 is a section of the device through the line 2—2 of Fig. 1;

Fig. 3 is a section of the device through the line 3—3 of Fig. 2;

Fig. 4 is a modification of the device shown in Fig. 1;

Fig. 5 is a section through line 5—5 of Fig. 4;

Fig. 6 is a fragmentary section showing a detail of modified construction of the device shown in Fig. 1.

Figure 7:
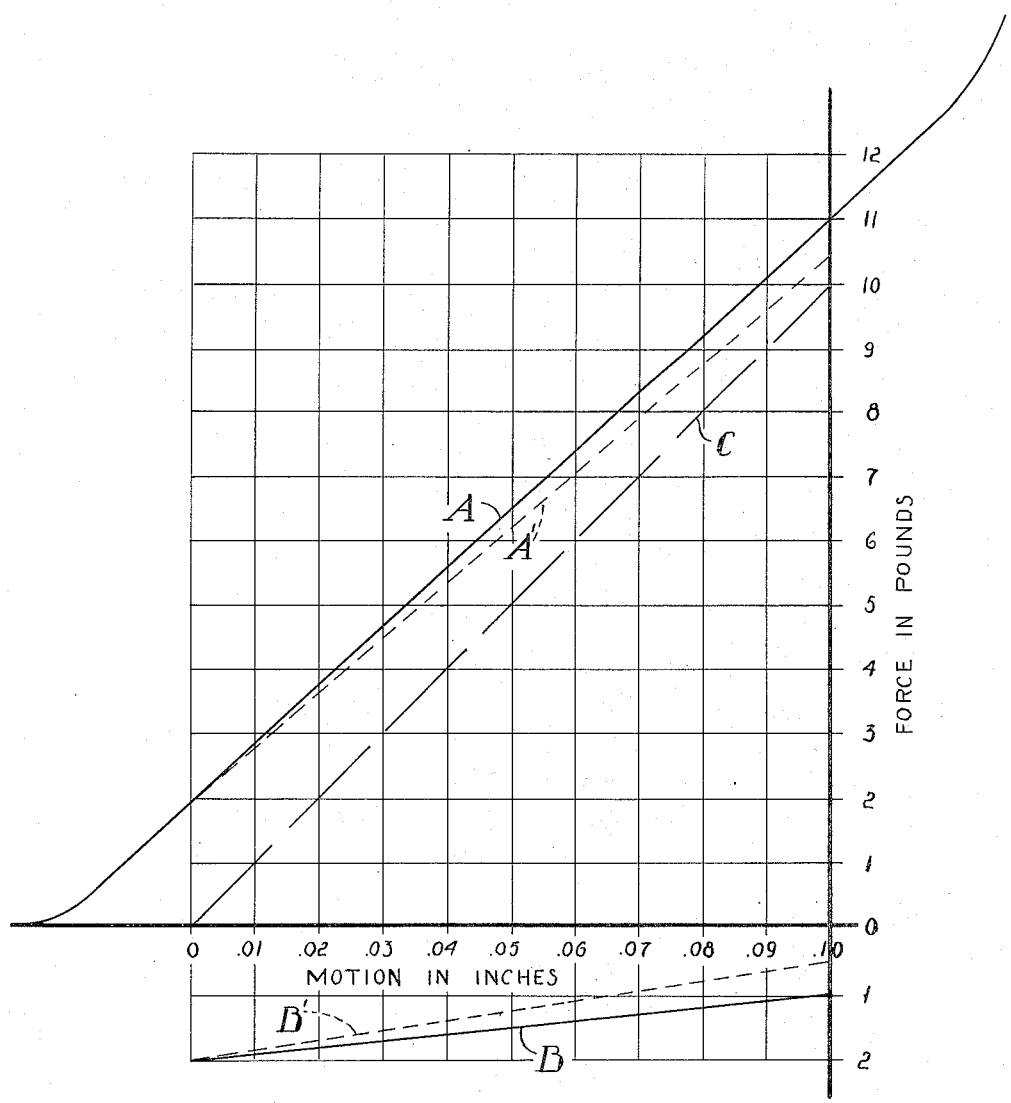
Fig. 7 is a chart showing the relationship of the main spring and the preloading spring.

A indicates a casing through which extends a rod 2 supported at both ends by spring bearings 4 which are made of very thin spring steel and have a spiral cut out portion 6. The bearings 4 are secured by screws 8 to the plates 10 and 11, respectively, and are fixedly secured to the rod 2 between the collars 12 and the shoulders 14 which are formed by reducing the end portions of the rod 2.

The rod 2 passes through the center of plates 10 and 11 without bearing against them. The clearance, however, is small enough so that if the rod 2 is moved laterally, the plates 10 and 11 will act as stops prior to any damage occurring to the bearings 4.

The ends of the rod 2 are threaded to permit securing various attachments such as the hook 13 and the pusher 15.

The lower casing section 16 and the upper casing section 18 are secured to the plates 10 and 11. The dial indicator 20 is secured to the plate 22 which is in turn secured to the upper casing section 18.

The dial indicator 20 may be any well known rack and gear type of suitable size and preferably of the type having a movable face for zero setting. It is preferred to use a dial indicator having a face divided into one hundred equal spaces, each space representing a movement of the contact point 24 of the indicator of one-thousandth of an inch and having a total capacity of approximately two-tenths of an inch.

The contact point 24 maintains contact with the collar 26 which is secured to the rod 2 by screw 28. A main spring 30, which, as shown in Figure 2, is a compression spring, is held between the collar 26 and the plate 11, both of which are formed to engage the spring 30 to prevent lateral movement of the spring 30.

A preloading spring 32, which is a tension spring, is secured to an eye 34 at the end of an adjustable abutment 36 which extends through the collar 26 and carries a holding and adjusting nut 38. The opposite end of the preloading spring 32 is secured to an eye 40 in bracket 42 which is attached to plate 11. It is preferred to select the preloading spring so that it has a gradient equal to about 10% of the gradient of the main spring and so that it preloads the main spring with approximately ten to twenty per cent. of full scale load.

One of the purposes of the preloading spring 32 is to compress the main spring 30 to a point where the relationship between the force applied to the main spring and the distance the main spring is displaced becomes linear.

An additional purpose of the preloading spring is to provide accurate means for correcting manufacturing errors in the gradient of the main spring and thus greatly increasing the accuracy of the device.

It is preferred to obtain a resultant from the forces exerted by the main spring 30 and the preloading spring 32 so that the movement of the rod 2 a distance of one-thousandth of an inch will require a force of $\frac{1}{10}$ of a pound. By so doing the graduations on the face of the preferred dial indicator 20 would each represent $\frac{1}{10}$ pound. In selecting the main spring 30, allowance must be made for the force exerted by the spring bearings 4 and the preloading spring 32 so that the combinations of the forces of all the springs produces the desired displacement of the rod 2 on the application of $\frac{1}{10}$ of a pound of force.

The rod 2 holds pin 44 which is encompassed by a slot 45 formed in the bracket 46 which is attached to the plate 22. The slot acts as a limit stop for the reciprocal movement of the rod 2 in order to prevent excessive movement of the rod 2 from damaging the spring bearings. It will be noted that normally the position of the rod 2 when at rest is determined by the preloading spring 32 and not by the slot 45. The rest position of the rod 2 being adjustable by the nut 38 on the rod 36. The slot 45 and the pin 44 also act as a rotation stop for the rod 2, but the pin normally does not touch the sides of the slot 45 since the spring bearings 4 prevent the rod 2 from rotating unless excessive torque is applied. Such excessive torque may occur when the below described fittings are removed from the ends of the rod 2.

As more specifically illustrative of the relationship of the main spring 30 and the preloading spring 32, consider a force measuring device capable of measuring a maximum force of 10 lbs. by traveling a distance of 0.1 inch. A main spring of 90 pounds per inch gradient and a preloading spring of 10 pounds per inch gradient may be used to get a resultant gradient of 100 pounds per inch. The main spring may be preloaded with two pounds by the preloading spring.

Referring to Fig. 7, the curve A represents a 90 pound per inch main spring, curve B a 10 pound per inch preloading spring which initially preloads the main spring by two pounds and curve C the resultant of curves A and B. To avoid confusion a scale of movement is given on the abscissa only for the resultant and not for the curves A and B.

A sufficient portion of curve A is shown to illustrate the well-known fact that the relationship between force and displacement of a coil spring is non-linear in the early portion of the curve and that it, however, soon becomes linear. Using the non-linear portion of the curve where it is requiring an increasing amount of force to displace the spring each additional unit of distance will obviously result in inaccurate measurement of a force.

To eliminate inaccuracy due to the early portion of the curve being non-linear, the preloading spring displaces the main spring about .03 inch by exerting an initial force of two pounds on it. It is apparent that this force places the operating range of the device outside the lower non-linear part of curve A and that this insures a linear resultant throughout the 0.1 inch range of the device since within that range curve B is also linear.

It will be also be noted that the upper portion of the curve A becomes non-linear and the maximum movement, limited in this case to 0.10 inch, insures that the upper non-linear portion of the curve is not utilized.

Errors in the production of the main spring may be readily corrected by the preloading spring since it has a large gradient compared to the preloading spring. In the case of the illustration of Fig. 7 the gradient of the main spring is nine times the gradient of the preloading spring. Thus to correct for an error of three per cent. in the gradient of the main spring, it requires a change of twenty-seven per cent. in the gradient of the preloading spring. Conversely an error of say 1% in the preloading spring would result in an error of only one tenth of 1% in the resultant.

By way of illustration, if we used a main spring A' having a gradient of 85 pounds per inch we could obtain the desired resultant C by preloading to two pounds with a spring B' having a gradient of 15 pounds per inch thereby correcting an error of minus 5.6 per cent. in the main spring by selecting a preloading spring having a gradient 50 per cent. greater than its designed gradient.

From the above illustrations it will be apparent that such a combination of springs permits the achievement of a high degree of accuracy in the device and also permits economy of manufacture. The main springs may be manufactured to a tolerance of plus or minus 3% and segregated into groups of ½%. The preloading springs then may be made to tolerances of plus or minus 27% and segregated into groups of 2%. By matching the springs to approach the desired resultant as nearly as possible a maximum error in the resultant of one ninth of one per cent. will result.

It should be noted that a very definite zero or rest position for the rod 2 is obtained since it is determined by the point where the forces of the oppositely acting springs are in equilibrium.

Figs. 4 and 5 illustrate the force device employing two main springs 52 which are tension springs. They are secured to notches 54 in the brackets 56 which are secured to the plate 22. The opposite ends of the spring 52 are secured to the equalizing bar 58 which is pivoted on the rod 2 at 69. An adjustable abutment 36 extends through a bar 62 which extends through rod 2. The contact point 24 maintains contact with the bar 62.

Fig. 6 illustrates an alternative shaft bearing comprising balls 64, a cage 66, a sleeve 67, a washer 68 and a ring retaining clip 70.

By way of illustration of the operation of the device illustrated in Figs. 1 and 2, consider the determination of the force a spring must have to do certain work, as, for example, to move the foot throttle linkage of an automobile. Having placed the linkage in the open position, we would secure the hook 13 of the device under the foot pedal attached to the linkage and pull on the casing A. As the casing A is pulled back, the rod 2 is displaced relative to the casing by overcoming the opposing force incident to the displacement of main spring 30. The collar 26 being secured to the rod 2 is displaced relative to the dial indicator 20. The contact point 24, however, maintains contact with the collar 26 and thus the dial indicator 20 indicates the displacement of the rod 2 and the main spring 30. By noting the indication of the dial indicator 20 just as the throttle linkage commences to move, we would have an accurate determination of the minimum force necessary to return the throttle linkage to the closed position.

It should be noted that the invention is not limited to the specific embodiments illustrated and described above, it being apparent that various modifications can be made.

What I claim and desire to protect by Letters Patent is:

1. A force measuring device comprising a housing, a member slidable in said housing, a main coil spring connected at one end to said housing and at the other end to said slidable member and having its axis in a common plane with the axis of said slidable member, a preloading coil spring connected at one end to said housing and at the other end to said slidable member, said preloading spring being selected with a gradient error that will compensate for the gradient error of the main spring and having its axis in a common plane with the axis of said slidable member, means on said slidable member for receiving a force to be measured and means attached to said housing and in operative engagement with said slidable member for indicating the force applied.

2. A force measuring device comprising a housing, a member slidable in said housing, a main coil spring connected at one end to said housing and at the other end to said slidable member and having its axis in a common plane with the axis of said slidable member, a preloading coil spring connected at one end to said housing and at the other end to said slidable member and having a small gradient in comparison with the main spring and having its axis in a common plane with the axis of said slidable member, a displacement limit stop connected to said housing and said slidable member, said preloading spring and said limit stop being adapted to keep the displacement of said main spring within a range in which the displacement has a substantially linear relationship to the force applied, means on said slidable member for receiving a force to be measured and means attached to said housing and in operative engagement with said slidable member for indicating the force applied.

3. A force measuring device comprising a housing, a member slidable in said housing, bearings for the slidable member each comprising a flat sheet of resilient metal having a spiral cut-out portion and being substantially perpendicular to the axis of the slidable member, said sheet having its outer edges connected to the housing and being centrally connected to said slidable member, a main coil spring connected at one end to said housing and at the other end to said slidable member and having its axis in a common plane with the axis of said slidable member, a preloading coil spring connected at one end to said housing and at the other end to said slidable member and having its axis in a common plane with the axis of said slidable member, means on said slidable member for receiving a force to be measured, and means attached to said housing and in operative engagement with said slidable member for indicating the force applied.

4. A force measuring device comprising a housing having a perforated plate in each end thereof connected to said housing, a member slidable in said housing and said perforated plates, bearings for the slidable member each comprising a flat sheet of resilient metal having a spiral cut-out portion and being substantially perpendicular to the axis of the slidable member, each of said sheets having its outer edge secured to one of said plates and being centrally connected to said slidable member, a main coil spring connected at one end to said housing and at the other end to said slidable member, a preloading coil spring connected at one end to said housing and at the other end to said slidable member, means on said slidable member for receiving a force to be measured and means attached to said housing and in operative engagement with said slidable member for indicating the force applied.

PHILIP C. CLARKE.

REFERENCES CITED

The following references are of record in the file of this patent:

UNITED STATES PATENTS

| Number | Name | Date |
|---|---|---|
| 1,001,635 | Goetz | Aug. 29, 1911 |
| 1,806,741 | Cameron | May 26, 1931 |
| 1,806,742 | Cameron | May 26, 1931 |
| 1,825,336 | Cross | Sept. 29, 1931 |
| 1,855,651 | Roberson | Apr. 26, 1932 |
| 1,961,368 | Larson | June 5, 1934 |
| 2,057,576 | Johnson | Oct. 13, 1936 |
| 2,239,049 | Morris | Apr. 22, 1941 |
| 2,281,001 | Clewell | Apr. 28, 1942 |
| 2,293,572 | Sutton | Aug. 18, 1942 |

FOREIGN PATENTS

| Number | Country | Date |
|---|---|---|
| 130,658 | Great Britain | Aug. 14, 1919 |
| 828,381 | France | Feb. 7, 1938 |